United States Patent [19]

Rockwell

[11] 4,178,998
[45] Dec. 18, 1979

[54] FOLDING MECHANISM FOR A MULTIPLE SECTION AGRICULTURAL IMPLEMENT

[75] Inventor: Randal L. Rockwell, La Porte, Ind.

[73] Assignee: Allis-Chalmers Corporation, Milwaukee, Wis.

[21] Appl. No.: 896,682

[22] Filed: Apr. 17, 1978

[51] Int. Cl.² .............................................. A01B 73/00
[52] U.S. Cl. ..................................... 172/311; 172/501
[58] Field of Search ............... 172/311, 383, 384, 386, 172/456, 457, 501, 583, 662; 56/228, 385; 254/86 H, 124

[56] References Cited

U.S. PATENT DOCUMENTS

| | | | |
|---|---|---|---|
| 3,948,327 | 4/1976 | Parker et al. | 172/311 |
| 4,047,575 | 9/1977 | Wagner | 172/311 |
| 4,074,766 | 2/1978 | Orthman | 172/311 |

*Primary Examiner*—Richard T. Stouffer
*Attorney, Agent, or Firm*—Charles L. Schwab

[57] ABSTRACT

A multiple section agricultural implement having laterally inner and outer wing sections on laterally opposite sides of a central section for relative folding movement about longitudinal axes by hydraulically powered folding mechanisms. The lost motion connections in the folding mechanisms permit the implement sections to float relative to one another during use of the implement thereby assuring proper position of the tools when traversing uneven ground. The hydraulic jack of the folding mechanism between the outer and inner wing sections includes a clevis which presents a shoulder in abutting relation to an upper, slotted end of a link connected to the outer wing section when the latter is folded to approximately an overhead balanced position. This abutting relationship, which continues to be present as the outer wing section is folded from its overhead balanced position to its inverted transport position, prevents uncontrolled movement of the outer wing section when the latter swings through its balanced overhead position.

12 Claims, 9 Drawing Figures

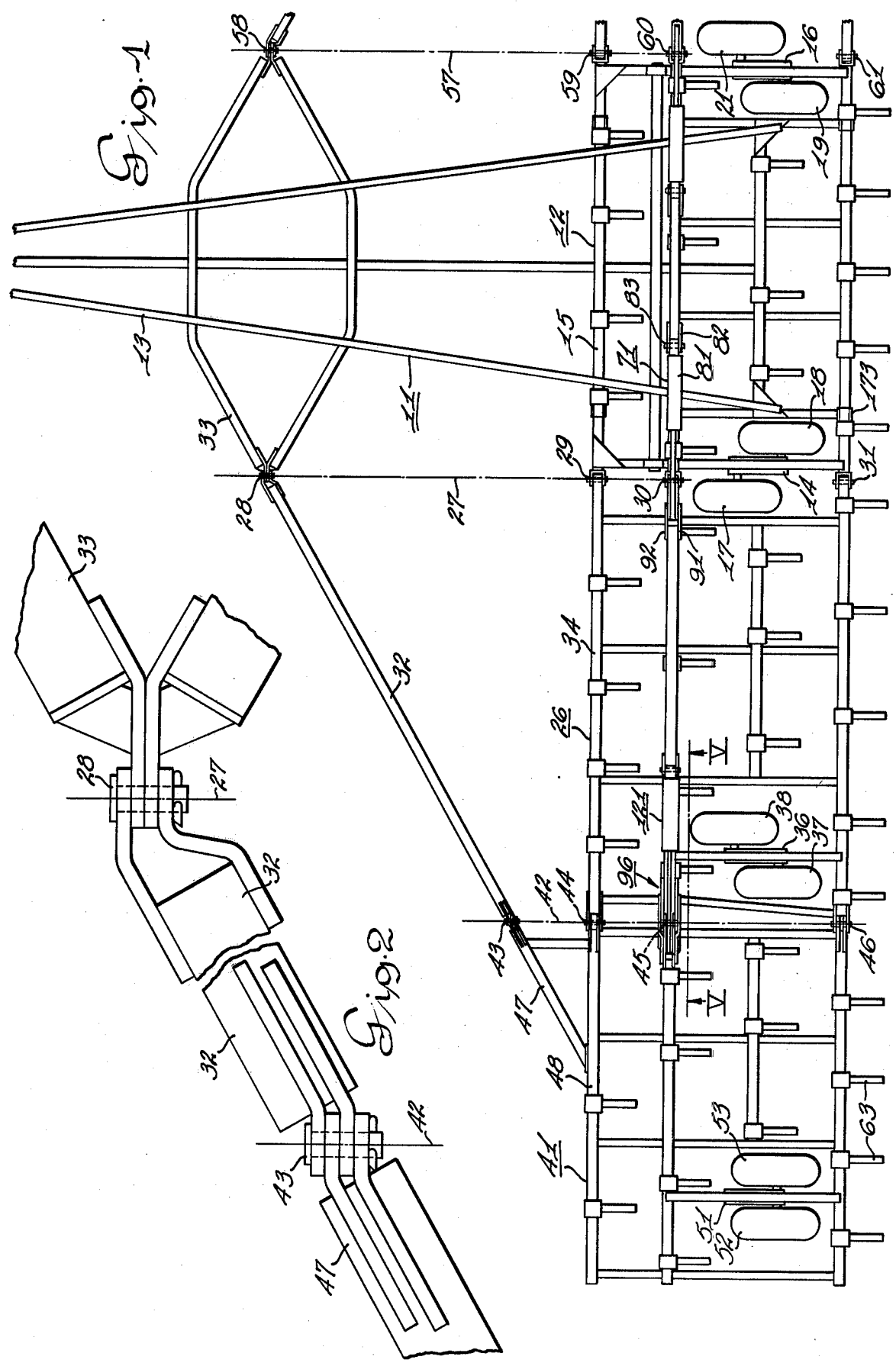

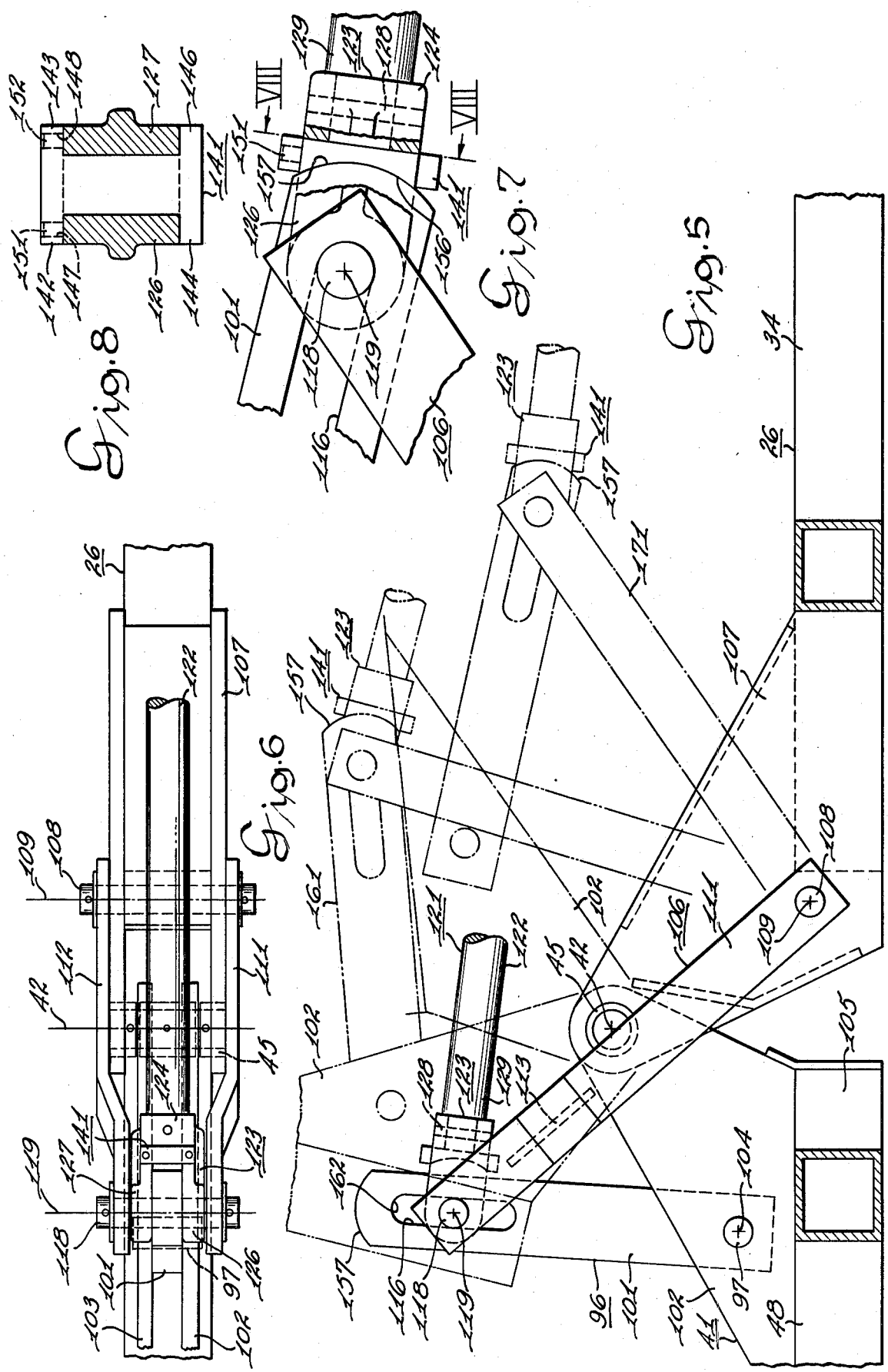

FOLDING MECHANISM FOR A MULTIPLE SECTION AGRICULTURAL IMPLEMENT

BACKGROUND OF THE INVENTION

A folding mechanism for a multiple section implement wherein a pair of links are utilized together with a hydraulic actuator to fold an outer wing section to an inverted overhead position above an inner wing section is shown in U.S. Pat. No. 3,948,327. The folding mechanism of this before-mentioned patent utilizes a pair of links having a lost motion connection.

SUMMARY OF THE INVENTION

The folding mechanism of the present invention has particular utility in a foldable, multiple section agricultural implement of the type having at least a pair of horizontally aligned sections with ground wheels and depending earthworking tools wherein the sections are pivotally interconnected on longitudinal folding axes permitting one section to pivot relative to the other section between an extended working position in which the sections are horizontally aligned to a folded position in which one section is in an inverted position above the other with its tools projecting upwardly. The folding mechanism includes a first link having one end pivotally connected to one section of the implement on a first axis which is spaced from the folding axis, a second link which has one end pivotally connected to the other section of the implement on a second axis spaced from the folding axis and from the first axis, a lost motion connecting means pivotally interconnecting the other ends of the links to one another including a slot in the other end of the first link, the slot being elongated lengthwise of the first link and a pin part secured to the other end of the second link and operatively disposed in the slot and a linear actuating means connected to the second link which is operable to pivot the one section relative to the other section from the working position to a balanced overhead position and to a folded position. The actuating means includes a component pivotally connected to the other end of the second link which has an abutment shoulder in thrust transmitting engagement with the other end of the first link when the one section is in its overhead and folded positions. The pivot part may take the form of a pivot pin which may be connected to the component of the actuating means. The component may be a clevis having a base part from which a pair of legs extend and the abutment shoulder may be formed on a crotch plate disposed between the legs. The linear actuating means may take the form of a hydraulic jack comprised of piston and cylinder components, one of which is connected to the other section of the implement.

When the outer section is foled to a balanced overhead position, the abutment shoulder is in abutment with the end of the first link and this abutting relationship continues to exist as the outer section is folded to its inverted transport position. Thus, the lost motion between the links, which allows relative movement between the sections during working, is eliminated as the outer section is folded through its overhead balanced position to its inverted folded position.

BRIEF DESCRIPTION OF THE DRAWINGS

The foldup implement using the invention is illustrated in the drawings in which:

FIG. 1 is a partial top view of a five section agricultural implement;

FIG. 2 is an enlarged partial top view of two pivot joints between sections of the implement shown in FIG. 1;

FIG. 5 is an enlarged section view taken on the line V—V in FIG. 1;

FIG. 6 is a top view of the pivot joint and fold-up mechanism shown in FIG. 5;

FIG. 7 is an enlarged rear view of part of the folding mechanism when the latter is in its folded position;

FIG. 8 is a section view taken along the line VIII—VIII in FIG. 7; and

DETAILED DESCRIPTION OF THE INVENTION

Figure 4:
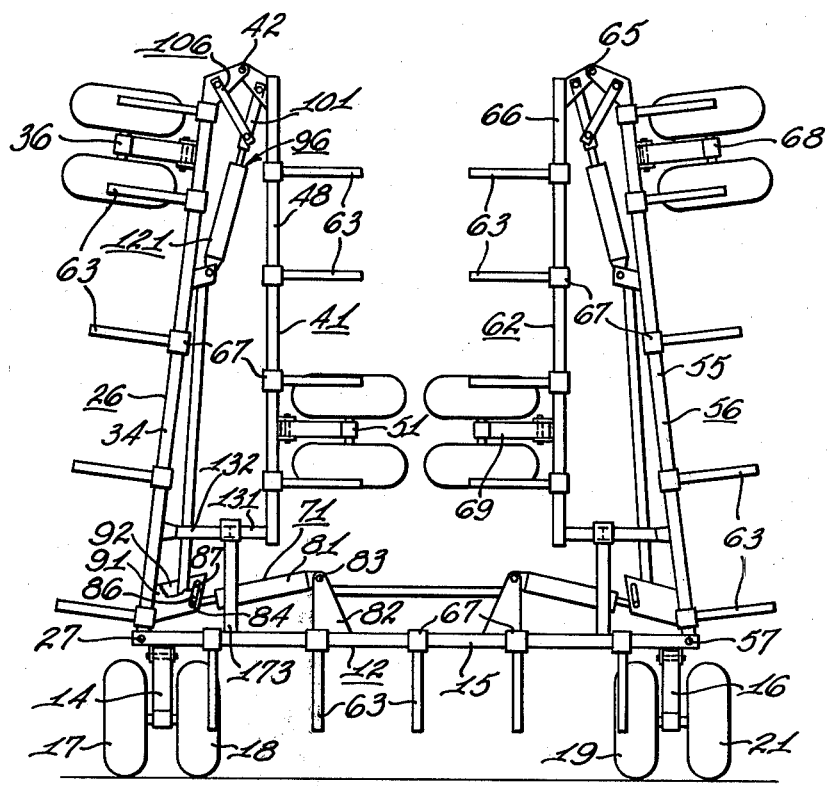
FIG. 4 is a rear view of the implement shown in FIG. 1 showing the implement completely folded for transport.

Referring to FIGS. 1 and 2, a multiple section agricultural implement in the form of a folding field cultivator 11 includes a central section 12 having a draft structure 13 adapted for connection to a towing tractor (not shown). The central section 12 includes wheeled support structures, 14, 16 having offset dual wheels 17, 18, and 19, 21, respectively. The frame 34 of an inner wing section 26 is pivotally connected on a horizontal, longitudinal axis 27 to the frame 15 of the central section 12 by pivot means including four pivot pins 28, 29, 30, 31. Pivot pin 28 pivotally connects a diagonal tension bar 32 to a laterally extending brace structure 33 rigidly secured to the draft structure 13. A wheeled support structure 36 with dual wheels 37, 38 is provided at the laterally outer end of the inner wing section 26. The frame 48 of an outer wing section 41 is pivotally connected to the laterally outer side of the frame 34 of the inner wing section 26 on a horizontal, longitudinal axis 42 by pivot pins 43, 44, 45, 46. Pivot pin 43 pivotally interconnects the diagonal tension bar 32 to a draft bracket 47 rigidly secured to the frame 48 of the outer wing section 41. A wheeled support structure 51, with a pair of dual wheels 52, 53, is connected to the laterally outer part of the outer wing section frame 48. It will be noted that the diagonal tension bar 32 is connected only by the pins 28, 43. In other words, there is no direct connection between the diagonal tension bar 32 and the inner wing section 26; however, it remains generally coplanar therewith in all working and folded positions.

Figure 3:
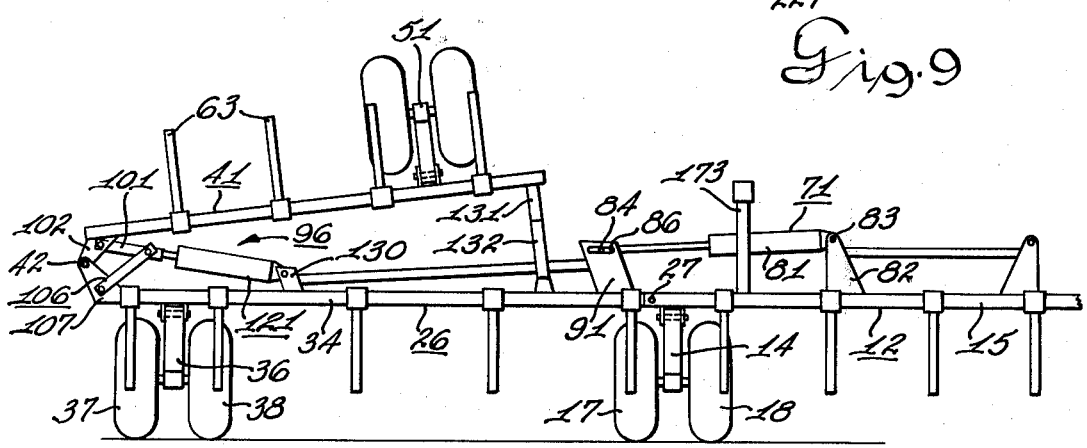
FIG. 3 is a partial rear view of the implement shown in FIG. 1 showing an outer wing section folded to an inverted position above an inner wing section.

Referring also to FIGS. 3 and 4, the frame 55 of an inner wing section 56 is pivotally connected to the frame 15 of the central section 12 on a horizontal, longitudinal axis 57 by pivot pins 58, 59, 60, 61 and the frame 66 of an outer wing section 62 is pivotally connected to the inner wing section frame 55 on a longitudinal axis 65. The outer wing section 62 and the inner wing section 56 are reverse images of the wing sections 41 and 26, respectively. All of the sections 12, 26, 41, 56 and 62 carry earthworking members 63, which are secured to the frames 15, 34, 48, 55, 66 by suitable clamps 67. Dual wheel support structures 68 and 69 are mounted on frames 55 and 66, respectively. All the support structures 14, 16, 36, 51, 68, 69 are adjustable, relative to the frames of the field cultivator sections on which they are mounted, by suitable power means (not shown) so as to act as guage wheels during cultivation and as support wheels when the frames are raised.

A power operated folding mechanism 71 is provided for folding the inner wing section 26 relative to the central section 12 which includes a linear actuating means in the form of a double acting hydraulic jack 81 having its cylinder component pivotally connected to an upstanding bracket 82 of the frame 15 by a pivot pin 83. The rod end of the hydraulic jack 81 includes a pin 84 at its outer end which is slideably mounted in aligned slots 86, 87 in longitudinally spaced parallel brackets 91, 92. This provides a lost motion connection permitting the inner wing section 26 to float relative to the central section 12.

Referring also to FIGS. 5 through 8, a folding mechanism 96 for folding the outer wing section 41 relative to the inner wing section 26 about axis 42 includes a link 101 having its lower end pivotally connected by a pin 97 to a pair of upstanding, parallel, longitudinally spaced flanges 102, 103 for swinging movement about a longitudinal axis 104. The flanges 102, 103 are secured as by welding to a transverse member 105 of the frame 48 of the outer wing section 41. The folding mechanism 96 includes a second link 106 which has its lower end pivotally connected to a pivot bracket 107 by a longitudinally extending pivot pin 108 for pivotal movement about a horizontal longitudinal pivot axis 109. The link 106 includes a pair of legs 111, 112 which are rigidly interconnected by a longitudinally extending plate 113 secured as by welding to the confronting sides of the legs 111, 112. The upper ends of the links 101, 106 are pivotally connected to one another by a lost motion connecting means which includes a slot 116 formed in the upper end of link 101, the slot being elongated lengthwise of the link 101. In other words, the slot 116 extends radially from the pivot axis 104 of pivot pin 97. The lost motion connecting means includes a longitudinally extending pivot part in the form of a pin 118, with an axis 119, which is connected to the upper end of link 106 and extends longitudinally through the slot 116 for cooperating sliding engagement therewith. The upper ends of the flanges 102, 103 and bracket 107 are pivotally interconnected by the longitudinally extending pivot pin 45. When the wing sections are in their extended working positions, as shown in FIGS. 1, 5 and 6, the axis 104 of pivot pin 97 is spaced below and laterally outward of the folding axis 42, the axis 109 of pivot pin 108 is spaced below and laterally inward of the folding axis 42 and the axis 119 of pivot pin 118 is spaced above the folding axis 42. In the position illustrated in FIGS. 5 and 6, the outer wing section 41 is in an extended working position and is free to swing in a 30 degree arc about the folding pivot axis 42 between a position 15 degrees above the horizon to a position 15 degrees below the horizon. The swinging or floating movement is permitted by the lost motion connection represented by the slot 116 and the pin 118. The folding mechanism 96 is completed by a linear actuating means in the form of a double acting hydraulic jack 121 which has a piston component 122 which includes a clevis 123 secured to the end of its rod 129. The clevis 123 includes a base part 124 from which a pair of legs 126, 127 extend. The base part is secured by a pin 128 or other suitable means to the rod 129 of the piston component 122.

As shown in FIG. 3, the wing folding mechanism 96 is in its folded transport position wherein the outer wing section 41 has been pivoted to an inverted position above the inner wing section 26 in which condition the tools 63 extend in an upward direction. The hydraulic jack 121 has been contracted and an abutment arm 131 on the outer wing section 41 rests on the top of an abutment arm 132 on the inner wing section 26. The hydraulic jack 121 has its cylinder component pivotally connected to a bracket 130 secured as by welding to the frame 34 of the inner wing section 26.

Referring to FIGS. 7 and 8, the clevis 123 includes a crotch plate 141 which has laterally outwardly extending flanges 142, 143, 144, 146. Flanges 142, 143 have threaded openings 147, 148 in which set screws 151, 152 are threaded to secure the crotch plate 141 to the legs 126, 127 of the clevis 123. The crotch plate 141 includes an outwardly facing concave bearing surface 156 which is complementary to a convex bearing surface 157 on the upper extremity or end of link 101. The distance between the cylindrical peripheral surface of pivot pin 118 and the concave surface 156 of the crotch plate 141 is substantially equal to the distance between cylindrical surface 162 at the upper end of the slot 116 and the convex surface 157. In the folded position of the folding mechanism 96, the abutting engagement between surfaces 156 and 157 prevents the pin 118 from moving from the upper end of the slot 116. The crotch pad 141 is made of a suitable wear resistant material and should it become excessively worn it may easily be replaced by loosening the set screws 151, 152 and removing the pin 118.

Figure 9:
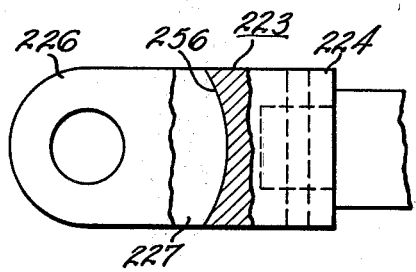
FIG. 9 illustrates a modified form of clevis for the hydraulic actuator of the folding mechanism.

FIG. 9 shows a clevis 223 which is an alternate construction for the clevis 123. The clevis 223 is made of suitable wear resisting material and includes a concave bearing surface 256 formed on the crotch area of its base part 224 between the legs 226, 227. The clevis 223 requires fewer parts and is less costly to manufacture.

OPERATION

When it is desired to fold the multi-sectioned implement from its extended earthworking position shown in FIG. 1 to the completely folded position shown in FIG. 4, the operator will first cause the double acting hydraulic jack 121 to be contracted by operating an appropriate hydraulic control (not shown). As the jack 121 is contracted, the outer wing section 41 will be pivoted in a clockwise direction, as viewed in FIG. 5, to a balanced overhead position shown in broken lines 161. In this overhead position the pin 118 will have moved to the upper end of the slot 116 where it abuts against the cylindrical end surface 162 and the pin 118 is locked in such position at the end of the slot 116 by the abutting engagement of the curved surfaces 156, 157 on the link 101 and clevis 123. Further contraction of jack 121 will fold the outer wing section 41 to an inverted transport position as shown in FIG. 3 and by broken lines 171 in FIG. 5. In this inverted position, the outer wing section 41 has been pivoted slightly less than 180 degrees from its horizontal working position. In this transport position, the pin 118 remains locked in the end of the slot 116 remote from pin 97 by the abutment of the thrust transmitting complementary curved surfaces 156, 157. In summary, as the outer wing section 41 approaches its balanced overhead position, the surfaces 156, 157 come into engagement to prevent further lost motion movement of the pin 118 in the slot 116 as the outer wing 41 moves through the balanced overhead position to the inverted transport position. Thus, the lost motion permitted during a field operation is automatically eliminated as the outer wing is folded up.

After the outer wing 41 is folded, the operator will cause, through appropriate control means (not shown), the jack 81 to contract thereby pivoting the inner wing section 26 to an upright transport position as shown in FIG. 4. In this position, the ends of the abutment arms 131, 132 will come to rest on a third abutment arm 173 secured to and extending upwardly from the frame 15 of the central section 12. If desired, the abutment arms 131, 132 may be locked to abutment arm 173 during transport of the implement.

The embodiments of the invention in which an exclusive property or privilege is claimed are defined as follows:

1. In a foldable, multiple section agricultural implement of the type having a pair of horizontally aligned sections and depending earthworking tools, said sections being pivotally interconnected on a longitudinal folding axis permitting one section to pivot relative to the other section between an extended working position in which said sections are horizontally aligned and a folded position in which said one section is in a reversed position above said other section with its tools projecting upwardly, a folding mechanism comprising:

a first link having one end pivotally connected to said one section on a first axis spaced from said folding axis, a second link having one end pivotally connected to the other section on a second axis spaced from said folding and first axes, lost motion connecting means pivotally connecting the other ends of said links to one another including, a slot in the other end of said first link, said slot being elongated lengthwise of said first link, and a pin part secured to the other end of said second link and operatively disposed in said slot, and a linear actuating means mounted on said implement and connected to said second link operable to pivot said one section relative to said other section from said working position to a balanced overhead position and to said folded position, said actuating means including a (component) clevis having a base part from which a pair of legs extend, said legs being pivotally connected to said other end of said second link and said base part having an abutment shoulder in thrust transmitting engagement with said other end of said first link when said one section is in said overhead and folded positions, said abutment shoulder being out of engagement with said other end of said first link when said one section is in said working position.

2. The implement of claim 1 wherein said pin part is a pivot pin and said legs are connected to said pivot pin.

3. The implement of claim 1 wherein said linear actuating means is connected to said other section.

4. The implement of claim 1 wherein said linear actuating means is a hydraulic jack.

5. The implement of claim 4 wherein said hydraulic jack includes piston and cylinder components.

6. The implement of claim 5 wherein said piston component includes a rod with a clevis secured thereto.

7. The implement of claim 6 wherein said other end of said first link includes a convex surface and said abutment shoulder includes a concave surface, said surfaces being in thrust transmitting engagement when said one section is in its overhead and folded position.

8. The implement of claim 7 wherein said pin part is a pin connected to said legs of said clevis and to said other end of said second link.

9. The implement of claim 7 or 8 wherein clevis includes a crotch plate releasably mounted thereon and wherein said concave surface is on said crotch plate.

10. The implement of claims 7 or 8 wherein clevis includes a crotch plate and wherein said concave surface is on said crotch plate.

11. The implement of claim 8 wherein said cylinder component is pivotally connected to said other section.

12. The implement of claim 1 wherein said first and second axes are below and at laterally opposite sides, respectively, of said folding axis when said one section is in its working position.

* * * * *